US012675086B2

(12) United States Patent
Rakshit et al.

(10) Patent No.: US 12,675,086 B2
(45) Date of Patent: Jul. 7, 2026

(54) COMPUTER IMPLEMENTED MANAGEMENT OF DATA CENTER THERMAL INTERACTION WITH THERMOELECTRIC GENERATORS

(71) Applicant: International Business Machines Corporation, Armonk, NY (US)

(72) Inventors: Sarbajit K. Rakshit, Kolkata (IN); Jagabondhu Hazra, Bangalore (IN); Manikandan Padmanaban, Chennai (IN); Marc Henri Coq, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 18/298,658

(22) Filed: Apr. 11, 2023

(65) Prior Publication Data

US 2024/0345556 A1 Oct. 17, 2024

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; G05B 19/00; G05B 2219/00; H05K 7/22; H05K 7/20772
See application file for complete search history.

(56) References Cited

U.S. PATENT DOCUMENTS

| | | | |
|---|---|---|---|
| 10,693,052 B2 | 6/2020 | Harding | |
| 10,998,483 B1 | 5/2021 | Manousakis | |
| 2009/0107536 A1 | 4/2009 | Sicuranza | |
| 2010/0065380 A1* | 3/2010 | Chen | B66B 1/302 |
| | | | 187/290 |
| 2012/0111386 A1* | 5/2012 | Bell | H10N 10/00 |
| | | | 700/297 |
| 2012/0152298 A1 | 6/2012 | Casali | |

(Continued)

FOREIGN PATENT DOCUMENTS

| | | |
|---|---|---|
| CN | 103377084 A | 10/2013 |
| CN | 105698312 A | 6/2016 |

(Continued)

OTHER PUBLICATIONS

Jouharaa, Thermoelectric generator (TEG) technologies and applications, 2021, International Journal of Thermofluids, p. 1-18 (Year: 2021).*

(Continued)

*Primary Examiner* — Kidest Worku
(74) *Attorney, Agent, or Firm* — Michael A. Petrocelli

(57) ABSTRACT

Management of thermal energy from a computer data center to generate an electrical power output using a thermoelectric generator can include a computer managing thermal output of heat at a location at a computer data center, where the location corresponds to a heat generating computer component. Heat flow is managed from the thermal output using a heating thermal conduit thermally communicating with a heat source of a thermoelectric generator. An electrical output generated by the thermoelectric generator is controlled using the management of the heat flow from the thermal output.

20 Claims, 9 Drawing Sheets

(56)                 References Cited

U.S. PATENT DOCUMENTS

| | | | | |
|---|---|---|---|---|
| 2016/0284962 | A1* | 9/2016 | Harding | H10N 10/13 |
| 2018/0351069 | A1* | 12/2018 | Boukai | H10N 10/13 |
| 2022/0394888 | A1* | 12/2022 | Kulkarni | H05K 7/2039 |
| 2024/0040753 | A1* | 2/2024 | Khan I | G06F 11/3058 |

FOREIGN PATENT DOCUMENTS

| | | |
|---|---|---|
| CN | 108271338 A | 7/2018 |
| CN | 108448944 A | 8/2018 |
| CN | 110445419 A | 11/2019 |
| WO | 2024/213944 A1 | 10/2024 |

OTHER PUBLICATIONS

International Searching Authority, "Notification of Transmittal of the International Search Report and the Written Opinion of the International Searching Authority, or Declaration," Patent Cooperation Treaty, Sep. 10, 2024, 7 pages, International Application No. PCT/IB2024/052140.

Antal, et al., "Transforming Data Centers in Active Thermal Energy Players in Nearby Neighborhoods", Sustainability, vol. 10, Issue 4, Article 939, Mar. 2018, 20 pages, <https://www.researchgate.net/publication/324093748>.

Artal-Sevil, et al., "Evaluation of a Thermoelectric Generation system based on Differential-Power Processing architecture under non-uniform temperature conditions", 2020 IEEE International Autumn Meeting on Power, Electronics and Computing (ROPEC 2020), Nov. 4-6, 2020, 6 pages, <https://ieeexplore.ieee.org/document/9258737>.

Femal, et al., "Boosting Data Center Performance Through Non-Uniform Power Allocation", Second International Conference on Autonomic Computing (ICAC'05), Jun. 13-16, 2005, 12 pages, <https://ieeexplore.ieee.org/document/1498069>.

Guo, et al., "Energy and Network Aware Workload Management for Sustainable Data Centers with Thermal Storage", IEEE Transactions On Parallel and Distributed Systems, vol. 25, No. 8, Aug. 2014, pp. 2030-2042, <https://ieeexplore.ieee.org/document/6654159>.

Gupta, et al., "GDCSim: A Tool for Analyzing Green Data Center Design and Resource Management Techniques", 2011 International Green Computing Conference and Workshops, Jul. 25-28, 2011, 8 pages, <https://ieeexplore.ieee.org/document/6008612>, doi: 10.1109/IGCC.2011.6008612.

Jamal, et al., "Hotspot-Aware Workload Scheduling and Server Placement for Heterogeneous Cloud Data Centers", Energies 2022, vol. 15, No. 7, Article 2541, Mar. 30, 2022, 20 pages, <https://www.mdpi.com/1996-1073/15/7/2541>.

Li, et al., "Thermal-Aware Hybrid Workload Management in a Green Datacenter towards Renewable Energy Utilization", Energies, Apr. 19, 2019, Issue 12, Article 1494, 18 pages, <https://www.mdpi.com/1996-1073/12/8/1494#cite>, https://doi.org/10.3390/en12081494.

Liu, et al., "GreenCloud: A New Architecture for Green Data Center", ICAC-INDST'09, Jun. 16, 2009, pp. 29-38, <https://www.researchgate.net/publication/228649283_GreenCloud_a_new_architecture_for_green_data_center>, DOI: 10.1145/1555312.1555319.

Sicuranza, Jeffery, "The Case for Thermoelectrics in the Data Center", Applied Methodologies, Inc., AMILABS Research, Oct. 2009, 48 pages, <https://amilabs.com/tgs/The%20Case%20for%20Thermoelectrics%20in%20the%20DC.pdf>.

Unknown, "System and Method to Schedule Jobs Within a Data Center Based on Current and Future Temperature Distributions", An IP.com Prior Art Database Technical Disclosure, Original Publication Date: Oct. 6, 2009, IP.com No. IPCOM000188419D, IP.com Electronic Publication Date: Oct. 6, 2009, 2 pages, <https://priorart.ip.com/IPCOM/000188419>.

Van Damme, et al., "Optimized Thermal-Aware Job Scheduling and Control of Data Centers", IEEE Transactions On Control Systems Technology, vol. 27, No. 2, Mar. 2019, pp. 760-771, <https://ieeexplore.ieee.org/document/8272441>.

Zhu, et al., "Heat to Power: Thermal Energy Harvesting and Recycling for Warm Water-Cooled Datacenters", 2020 ACM/IEEE 47th Annual International Symposium on Computer Architecture (ISCA), May 2020, pp. 405-418, <https://www.researchgate.net/publication/342911807>.

Fachini et al., "Heat Recovery and Power Generation Using Thermoelectric Generator", https://www.intechopen.com/chapters/66134, Apr. 19, 2019, 20 pages.

Koot et al., "Usage impact on data center electricity needs: A system dynamic forecasting model", Applied Energy, Jun. 2021, 13 pages.

No Author, "The Global Data Center Market Size to Reach $288.30 Billion by 2027", https://www.globenewswire.com/news-release/2022/02/23/2390642/0/en/The-Global-Data-Center-Market-Size-to-Reach-288-30-Billion-by-2027-Arizton.html, Feb. 23, 2022, 13 pages.

No Author, "Thermomagnetic generators convert waste heat into electrical power even at small temperature differences", https://www.nanowerk.com/nanotechnology-news2/newsid=57199.php, Feb. 3, 2021, 5 pages.

Peter Judge, "Synergy: there are 541 hyperscale data centers in the world", https://www.datacenterdynamics.com/en/news/synergy-there-are-541-hyperscale-data-centers-world/, Jul. 7, 2020, 6 pages.

* cited by examiner

OPTIMIZATION FRAMEWORK   <u>450</u>

$$max.C_M = \Lambda_{s=1...N} \Lambda_{k=1...N} \, distance \, (Q^k_{generated} - Q^s_{generated})$$

<u>452</u>

<u>454</u>

$$W^k_{allocation} = \{ Task_j \mid j \in \{1...M\} \, and \, W_{scheduling}(k)(j) > 0 \} \sim 1$$

$$Q^k_{generated}(T) = \overset{nc}{\underset{j=1}{\Lambda}} w(j) \, * \, /schedule \, (W^k_{allocation}) \sim 2$$

$$t^{kj}_{start} + t^j_{execution} \, \sigma \, t^j_{deadline} \sim 3$$

$$" t \, E[0...T], CPU_k(t) \, ? \quad \overset{M}{\underset{j=1 \, t^{kj}_{start} \, \sigma \, t \, \sigma \, t^{kj}_{start} + t^j_{execution}}{\Lambda}} \quad CPU_j(t) \sim 4$$

$$" t \, E[0...T], RAM_k(t) \, ? \quad \overset{M}{\underset{j=1 \, t^{kj}_{start} \, \sigma \, t \, \sigma \, t^{kj}_{start} + t^j_{execution}}{\Lambda}} \quad RAM_j(t) \sim 5$$

$$" t \, E[0...T], HDD_k(t) \, ? \quad \overset{M}{\underset{j=1 \, t^{kj}_{start} \, \sigma \, t \, \sigma \, t^{kj}_{start} + t^j_{execution}}{\Lambda}} \quad HDD_j(t) \sim 6$$

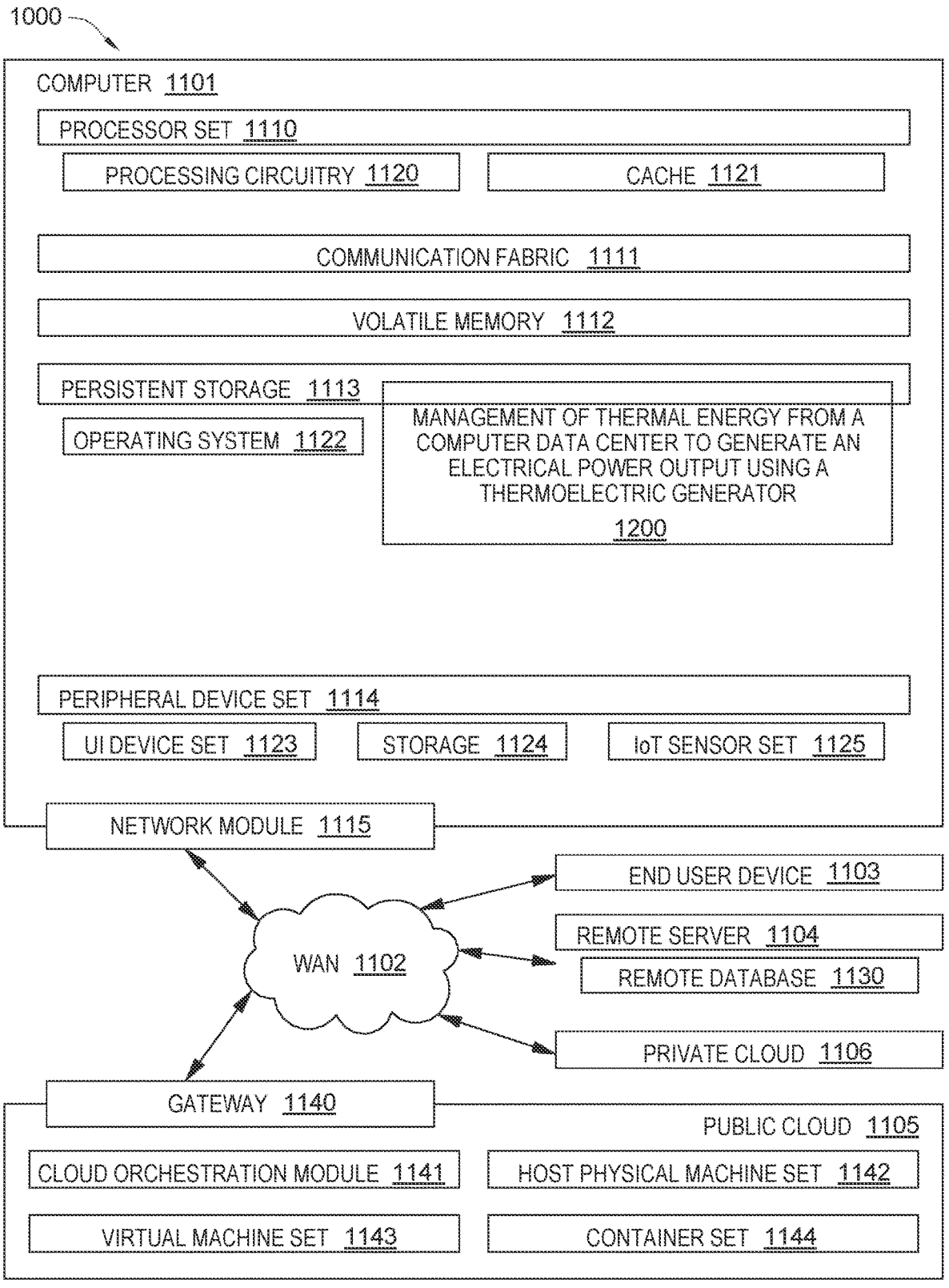

COMPUTER 1101

PROCESSOR SET 1110

PROCESSING CIRCUITRY 1120          CACHE 1121

COMMUNICATION FABRIC 1111

VOLATILE MEMORY 1112

PERSISTENT STORAGE 1113

OPERATING SYSTEM 1122

MANAGEMENT OF THERMAL ENERGY FROM A COMPUTER DATA CENTER TO GENERATE AN ELECTRICAL POWER OUTPUT USING A THERMOELECTRIC GENERATOR
1200

PERIPHERAL DEVICE SET 1114

UI DEVICE SET 1123          STORAGE 1124          IoT SENSOR SET 1125

NETWORK MODULE 1115

WAN 1102

END USER DEVICE 1103

REMOTE SERVER 1104

REMOTE DATABASE 1130

PRIVATE CLOUD 1106

GATEWAY 1140

PUBLIC CLOUD 1105

CLOUD ORCHESTRATION MODULE 1141          HOST PHYSICAL MACHINE SET 1142

VIRTUAL MACHINE SET 1143          CONTAINER SET 1144

FIG. 8

COMPUTER IMPLEMENTED MANAGEMENT OF DATA CENTER THERMAL INTERACTION WITH THERMOELECTRIC GENERATORS

BACKGROUND

The present disclosure relates to computer implemented intelligent distribution data center workload for managing thermal energy interaction with thermoelectric generators.

Data centers can include many computer and electronic components. The components can be mounted in racks, such as servers in server racks. Such data centers can have environmental controls, raised floors for wiring, security, and other features. One issue with data centers is controlling heat expelled from the many components to maintain an acceptable temperature level for the electronics in the data center. Another issue with data centers is managing the electrical power required to power/run the components, cooling, and other electrical features and components in the data center. Further, as data centers grow, that is become larger and add more power consuming components, energy usage consequently grows. Such electrical energy consumes is converted into heart while executing a workload, e.g., processing workload, designated to the data center.

SUMMARY

The present disclosure recognizes the shortcomings and problems associated with current techniques for managing the power consumption of a data center and the heat expended from processing workloads in the data center.

In one example according to the invention, a method and system can include computer implemented intelligent distribution of data center workloads for non-uniform thermal interaction with thermoelectric generators. In another example according to the present invention, a method and system can include converting heat energy emitted by multiple components in the data center, back to electricity using thermoelectric generators, which improves power utilization efficiency of the data center.

In an aspect according to the present invention, a computer-implemented method for management of thermal energy from a computer data center to generate an electrical power output using a thermoelectric generator, includes managing, using a computer, thermal output of heat at a location at a computer data center, the location corresponding to a heat generating computer component. The method includes managing, using the computer, heat flow from the thermal output using a heating thermal conduit thermally communicating with a heat source of a thermoelectric generator. The method further includes controlling an electrical output generated by the thermoelectric generator, using the management of the heat flow from the thermal output.

In a related aspect, the method further includes receiving, at the computer, ambient temperature data for the location corresponding to the heat generating computer component in the computer data center.

In a related aspect, the method further includes monitoring the ambient temperature data for the location.

In a related aspect, the thermoelectric generator uses a temperature difference between the heat input and a cooling element in the thermoelectric generator, the temperature difference being enabled by the heat flow, managed by the computer, to the heat source via the heating thermal conduit providing a heat input to the heat source.

In a related aspect, the method further including managing power consumption of the heat generating computer component to vary the thermal output from the heat generating computer component to control the heat flow to the heat source of the thermoelectric generator.

In a related aspect, the method further comprising managing, using the computer, a thermal connection to the heating conduit to control the heat flow to the heat source.

In a related aspect, the method further includes receiving at the computer, ambient temperature data for each of a plurality of locations corresponding to heat generating computer components in the computer data center.

In a related aspect, the method further includes selectively allowing heating thermal conduits corresponding to each of a plurality of locations corresponding to heat generating computer components in the computer data center, to provide heat flow, respectively from each of the heating thermal conduits, to the heat source of the thermoelectric generator.

In a related aspect, the method further includes monitoring ambient temperature data for each of a plurality of locations corresponding to heat generating computer components in the computer data center; and managing power consumption of the heat generating computer components to vary heat outputs corresponding to each of the heat generating computer components to control the heat flow from each of the heat generating computer components, using the heating thermal conduits, respectively, to the heat source of the thermoelectric generator.

In a related aspect, the method further includes selectively allowing heating thermal conduits corresponding to each of a plurality of locations corresponding to heat generating computer components in the computer data center, to provide heat flow, respectively from each of the heating thermal conduits, to corresponding heat sources of thermoelectric generators.

In a related aspect, the method further includes, monitoring ambient temperature data for each of a plurality of locations corresponding to the heat generating computer components in the computer data center; and managing power consumption of the heat producing components to vary heat outputs corresponding to each of the heat generating computer components to control the heat flow from each of the heat generating computer components, using the heating thermal conduits, respectively, to the corresponding heat sources of the thermoelectric generators, respectively.

In a related aspect, the method further includes managing, using the computer, a second thermal output at a cooling location at the computer data center, the second thermal output for cooling and thermally communicating with a heat sink; managing, using the computer, the second thermal output for cooling using a cooling conduit thermally communicating with the heat sink of the thermoelectric generator; and controlling the electrical output generated by the thermoelectric generator, by the management of the second thermal output for cooling.

In a related aspect, the method further includes receiving, at the computer, ambient temperature data for the cooling location corresponding to the heat sink in the computer data center; and selectively allowing the cooling conduit from the cooling location to provide cooling thermal conductivity to the heat sink of the thermoelectric generator.

In a related aspect, the method further including monitoring, at the computer, the ambient temperature data for the cooling location; and managing a second thermal connection to the cooling conduit to control the cooling thermal conductivity to the heat sink.

In a related aspect, the method further includes monitoring ambient temperature data for each of a plurality of locations corresponding to the heat generating computer components in the computer data center; selectively allowing heating thermal conduits corresponding to each of the plurality of locations corresponding to the heat generating computer components in the computer data center, to provide heat flow, respectively from each of the heating thermal conduits, to corresponding heat sources of an array of thermoelectric generators; managing power consumption of the heat producing components to vary heat outputs corresponding to each of the heat generating computer components to control the heat flow from each of the heat generating computer components, using the heating thermal conduits, respectively, to the corresponding heat sources of the array of thermoelectric generators, respectively; managing, using the computer, a second thermal output at a cooling location at the computer data center, the second thermal output for cooling using a cooling conduit thermally communicating with heat sinks of the array of thermoelectric generators, respectively; and controlling electrical outputs generated by each of the thermoelectric generators of the array of thermoelectric generators, by using the management of the heat flow from each of the heat generating computer components, and by using the management of the second thermal output for cooling thermally communicating with the heat sinks of the array of thermoelectric generators, respectively.

In a related aspect, the heating thermal conduit includes one of a plurality of elements thermally communicating with the heat source of the thermoelectric generator selected from a group consisting of: air, a conductive material thermally contacting the heat sink of the thermoelectric generator, and a fluid.

In a related aspect, the heat generating computer component is selected from a group consisting of: a switch, a server, and a router.

In a related aspect, the method further includes generating, using the computer, a digital model of the heat flow from the thermal output; and the controlling of the electrical output using the management of the heat flow being based on the digital model.

In another aspect, a system for management of thermal energy from a computer data center to generate an electrical power output using a thermoelectric generator includes a computer system. The computer system comprises: a computer processor, a computer-readable storage medium, and program instructions stored on the computer-readable storage medium being executable by the processor, to cause the computer system to perform the following functions to; manage, using a computer, thermal output of heat at a location at a computer data center, the location corresponding to a heat generating computer component; manage, using the computer, heat flow from the thermal output using a heating thermal conduit thermally communicating with a heat source of a thermoelectric generator; and control an electrical output generated by the thermoelectric generator, using the management of the heat flow from the thermal output.

In another aspect, an apparatus for management of thermal energy from a computer data center to generate an electrical power output using a thermoelectric generator, includes: a computer for managing a thermal output of heat at a location at a computer data center, the location corresponding to a heat generating computer component; a heating thermal conduit thermally communicating with the heat generating computer component and with a heat source of a thermoelectric generator, the heating thermal conduit being manageable using the computer to manage heat flow from the thermal output; and an electrical output being generatable by the thermoelectric generator, and the electrical output being controllable using the management, by the computer, of the heat flow from the thermal output.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 5 is a block diagram depicting an optimization framework of equations for optimizing operations in accordance with the embodiments of the present disclosure.

FIG. 8 is a schematic block diagram depicting a computer system according to an embodiment of the disclosure, which includes cloud computing components and functions, and which can cooperate with the systems and methods shown in the figures and described herein.

DETAILED DESCRIPTION

Figure 1:
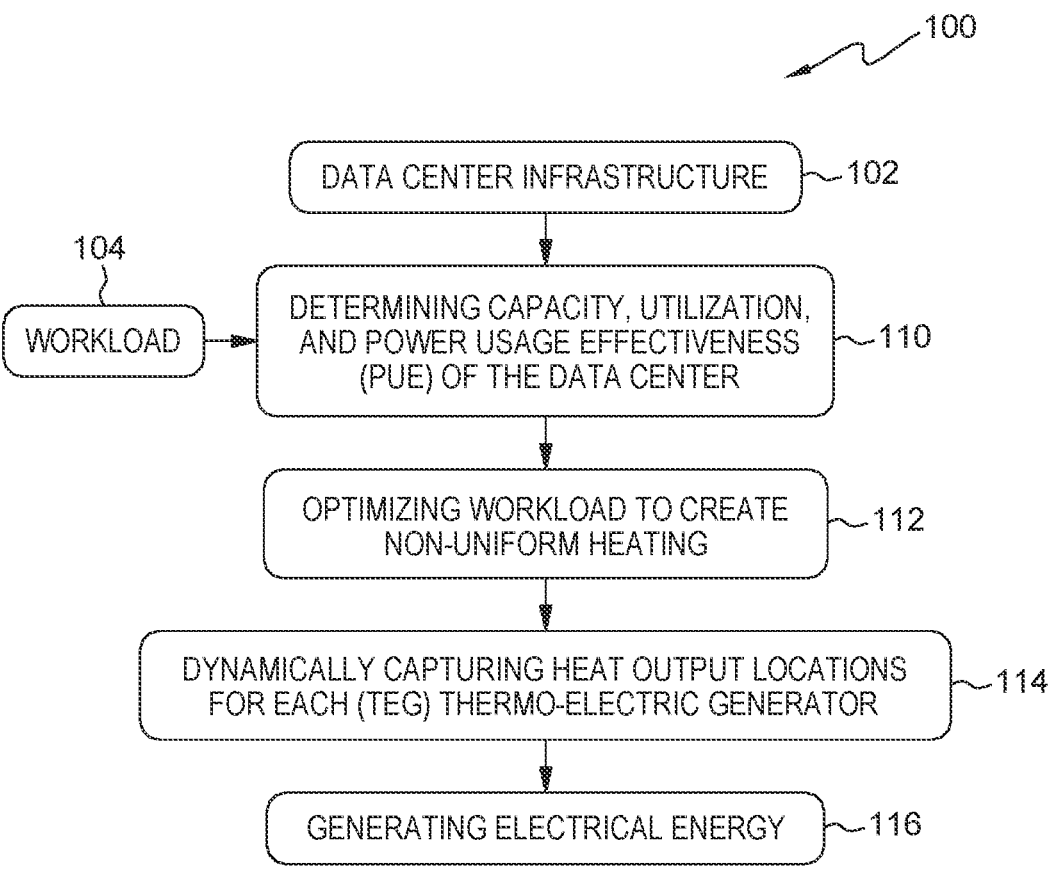
FIG. 1 is a flow chart of a method, according to an embodiment of the present disclosure, for management of thermal energy from a computer data center to generate an electrical power output using a thermoelectric generator.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

Referring to FIG. 1, according to an embodiment of the present disclosure, a computer implemented method 100 for management of thermal energy from a computer data center 103 and a workload 104, can include computer components in a data center, for example, electrical components stacked in racks in the data center. A system utilizing the method 100 can include in one embodiment data center infrastructure and a determine workload which can be managed by a computer implemented method as method 100 shown in FIG. 1. The method includes management of thermal energy to generate an electrical power output using a thermoelectric generator. The method includes determining a capacity, utilization, and a power usage effectiveness for a data center 102, as in block 110. The data center infrastructure 102 can include racks of computer components, such as servers, switches, and include routers and other networking and data storage components.

The method includes optimizing the workload/s to create non-uniform heating, as in block 112. Generation of non-uniform heating can be used to enhance electrical power or voltage generation using a thermoelectric generator.

The method includes dynamically capturing heat output location for each of a plurality of thermoelectric generators (TEGs), as in block 114. The method thereby generates electrical energy 116 from the thermoelectric generators.

In general, a method and system according to the present disclosure uses a data center heat generation while executing a workload to convert the thermal energy into electrical energy using a thermoelectric generator using the Seebeck effect. Thereby, at least some of the energy used by the data center can be converted back into electrical energy using thermoelectric generators, and thereby improve the power utilization efficiency (PUE) of a data center.

Conversion of thermal energy into electric energy can occur in a thermoelectric generator through the Seebeck effect based on an electric potential difference between two different materials, placed in contact at different temperatures. Data center loads are dynamic and vary over time and hence heat generated in data centers, for example, produced by electrical components in the racks in the data center, such as server and switches, can vary significantly across racks. Further, data center workloads can be dynamic and vary across racks and servers over time and hence, the heat generated in each data center is non-uniform. A temperature profile for each server can be estimated using thermal imaging. A temperature difference across servers can be leveraged to generate electricity using thermoelectric generators. A data center load can be distributed in such a way that a non-uniform temp profile is created across servers. As heat energy gets converted into electricity, HVAC (Heating Ventilation and Air Conditioning) cooling requirements are reduced significantly, and hence improves the power utilization efficiency of the electrical components in the data center.

Figure 2:
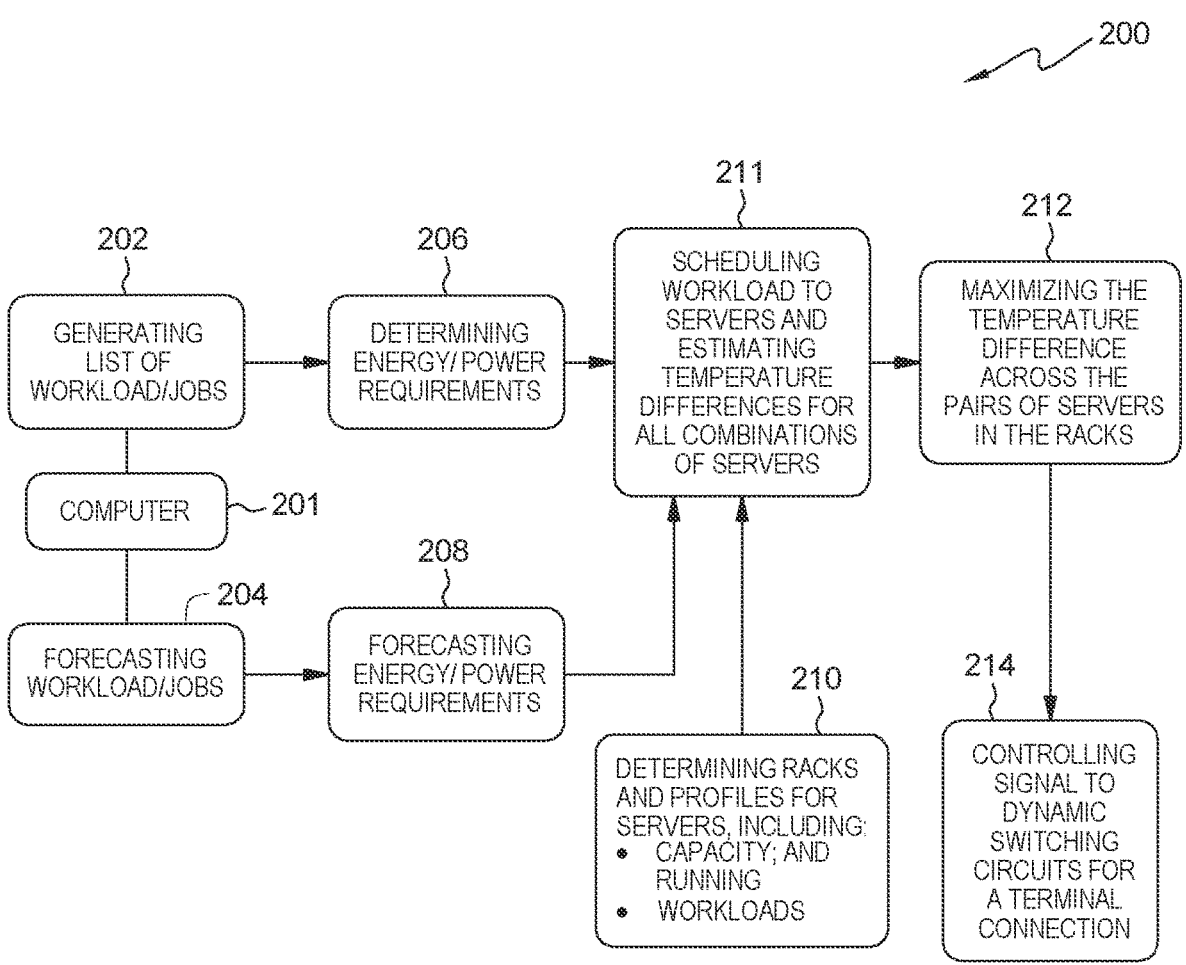
FIG. 2 is a flow chart of a method, according to another embodiment of the present disclosure, which can use the systems depicted in FIGS. 3A, 3B, and 3C, for management of thermal energy from a computer data center to generate an electrical power output using a thermoelectric generator.
Figure 3B:
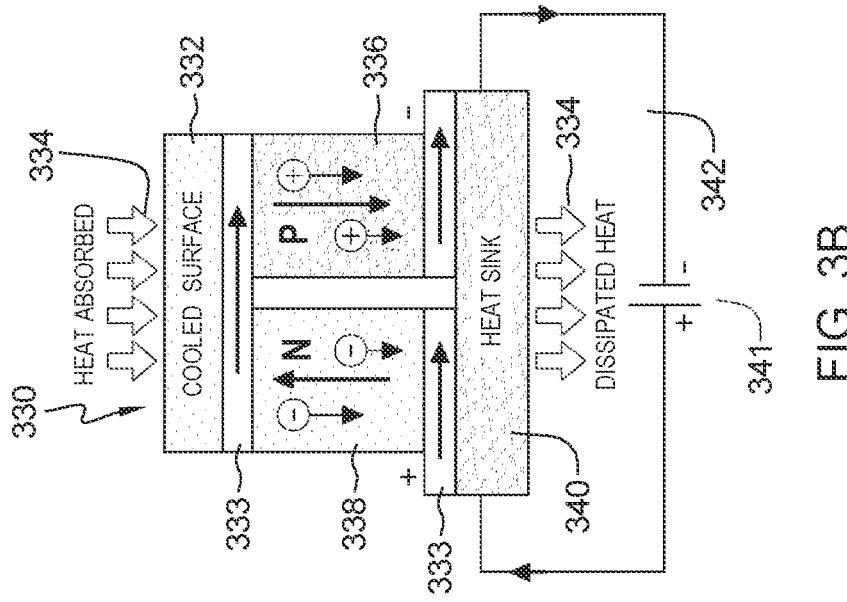
FIG. 3B is a schematic block diagram of a thermoelectric generator, according to an embodiment of the present disclosure.
Figure 3A:
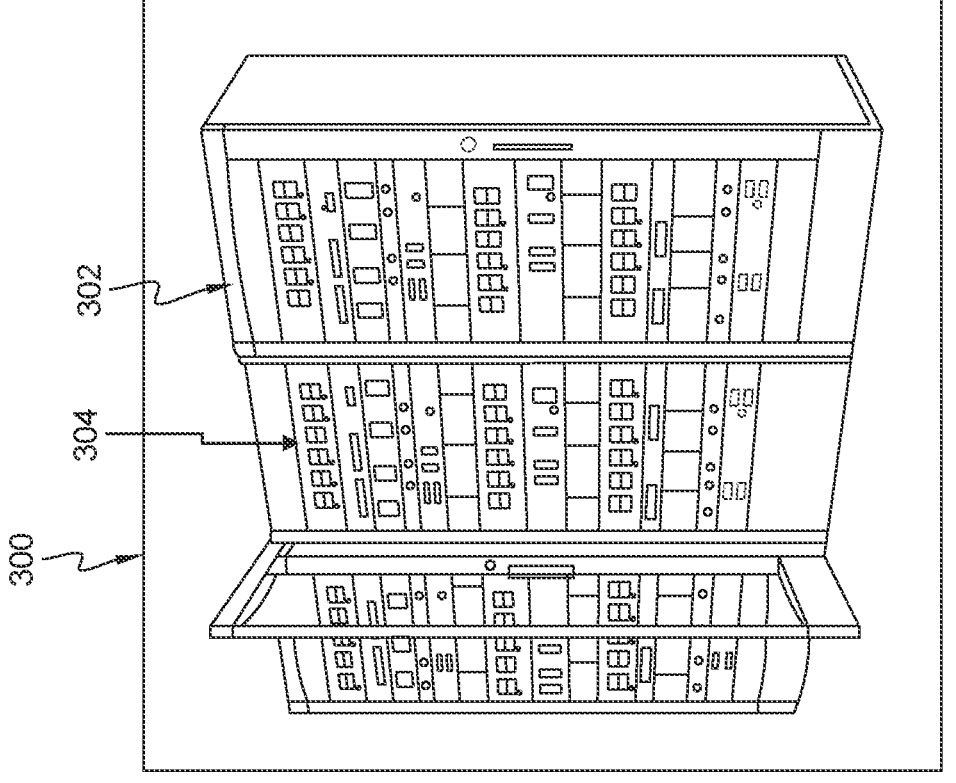
FIG. 3A is an isometric view of computer data center including a component rack, according to an embodiment of the present disclosure.
Figure 3C:
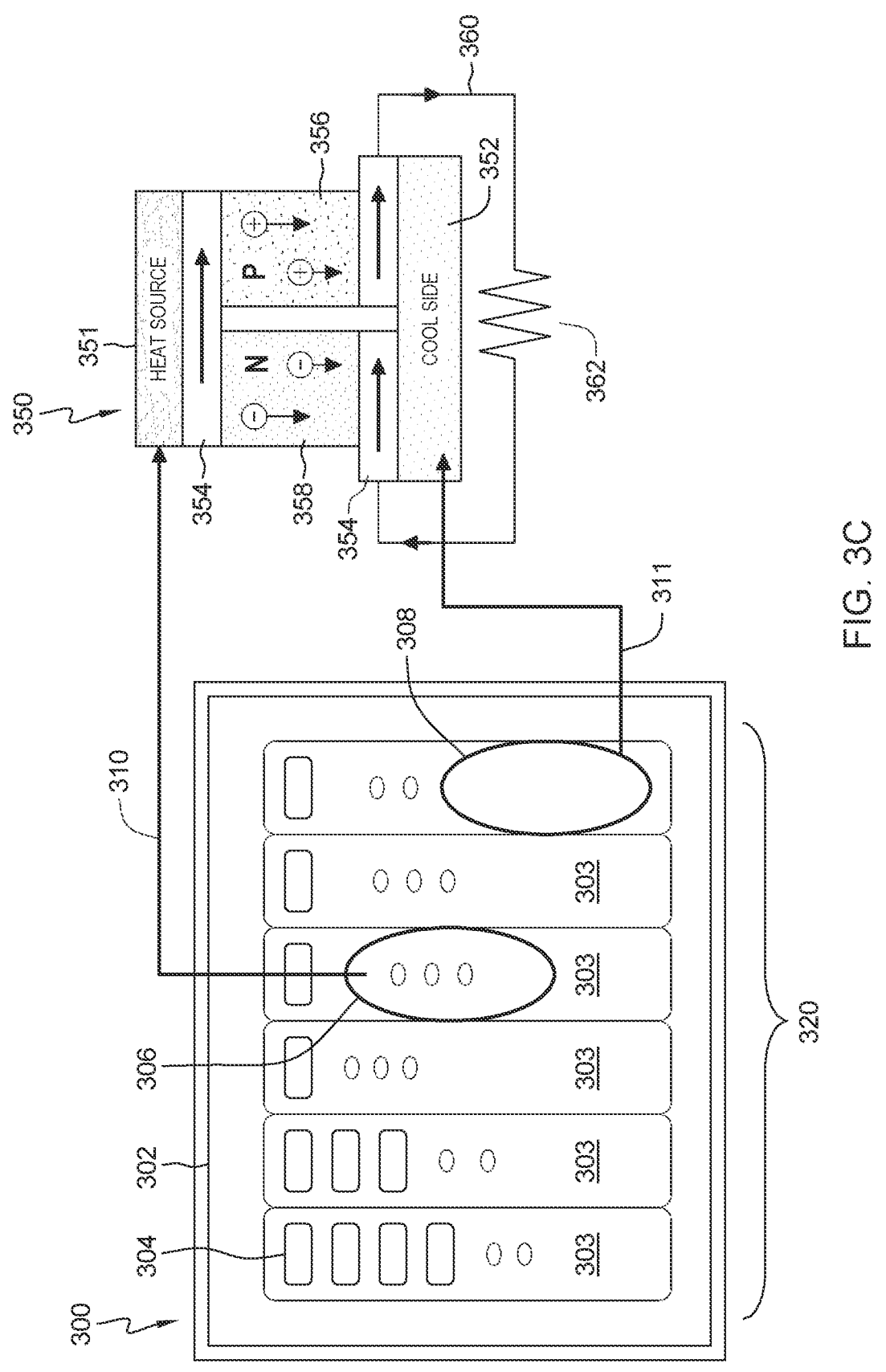
FIG. 3C is a schematic block diagram of a system, according to an embodiment of the present disclosure, for management of thermal energy from electrical components of a computer data center to generate an electrical power output using a thermoelectric generator.

Referring to FIG. 2, according to an embodiment of the present disclosure, a computer implemented method 200 for management of thermal energy from a computer data center 103 and a workload 104, can include systems and devices shown in FIGS. 3A, 3B and 3C. The method 200 is one embodiment of a methodology for optimizing a workload in a data center 300 using thermos electric generators 330. The data center includes a data center rack 302 or rack which includes electrical components 304, for example, server and switches. For example, the thermos-electric generator 330 includes a cooled surfaced 332 which can absorb heat 334. An N-Type area 338 between electrically conductive layers 333 has negatively charged electrons and a P-Type area 336 has positively charged electrons. A heat sink 340 dissipates heat 334. An electrical circuit 342 generates a voltage 341.

The method 200 includes generating, by a computer 201, a list of workloads or jobs, as in block 202, and forecasting a workload or jobs using the computer 201, as in block 204. The computer 201 can include a computer readable storage medium on which is stored a program for executing by a processor, in all or in part, operations according to the present method.

The method includes determining energy and power requirements in block 206. The method further includes forecasting energy and power requirements as in block 208. The method further includes determining racks 302 and server profiles for a plurality of servers 304, as computer components, which can include a server capacity and running workloads, as in operation 210. The method includes scheduling workload to servers and estimating temperature differences for all combinations of servers, as in operation 211.

Further the method includes maximizing the temperature difference across pairs of servers, for example, in racks, as in operation 212. The method includes controlling signal to dynamic switching circuits for terminal connection, as in operation 214.

Referring to FIG. 3C, a system 349 depicts the rack 302 in a rear view, for example, the rack 302 includes components 304 which can be divided into component rack areas 303 including components 304, which collectively encompass component rack area 320 producing heat or heat areas, and in some instances, producing cooling for example, air conditioning, or cooling areas. The system 349 includes a thermoelectric generator 350. A high heat thermal reading can occur in a rack area 303 at location 306, and a low heat thermal reading (a cool area) can occur in a rack area 303 at location 308. A heat conduit 310 and a cooling conduit 311 can be connected to the thermoelectric generator 350, at a heat source 351, and a cooling side 352, respectively. For example, the thermo-electric generator 350 includes the cooled side 352 which can provide a heat sink. The heat source 351 communicates with a conductive layer 354 and the cool side 352 communicates with a conductive material 354, between which is an N-Type area 358 between the electrically conductive layers 354 and has negatively charged electrons, and a P-Type area 356 which has positively charged electrons. An electrical circuit 360 has a resistor 362. As heat energy gets converted into electricity, HVAC (Heating Ventilation and Air Conditioning) cooling requirements are reduced significantly, and hence improves the power utilization efficiency of the electrical components in the data center.

Figure 4:
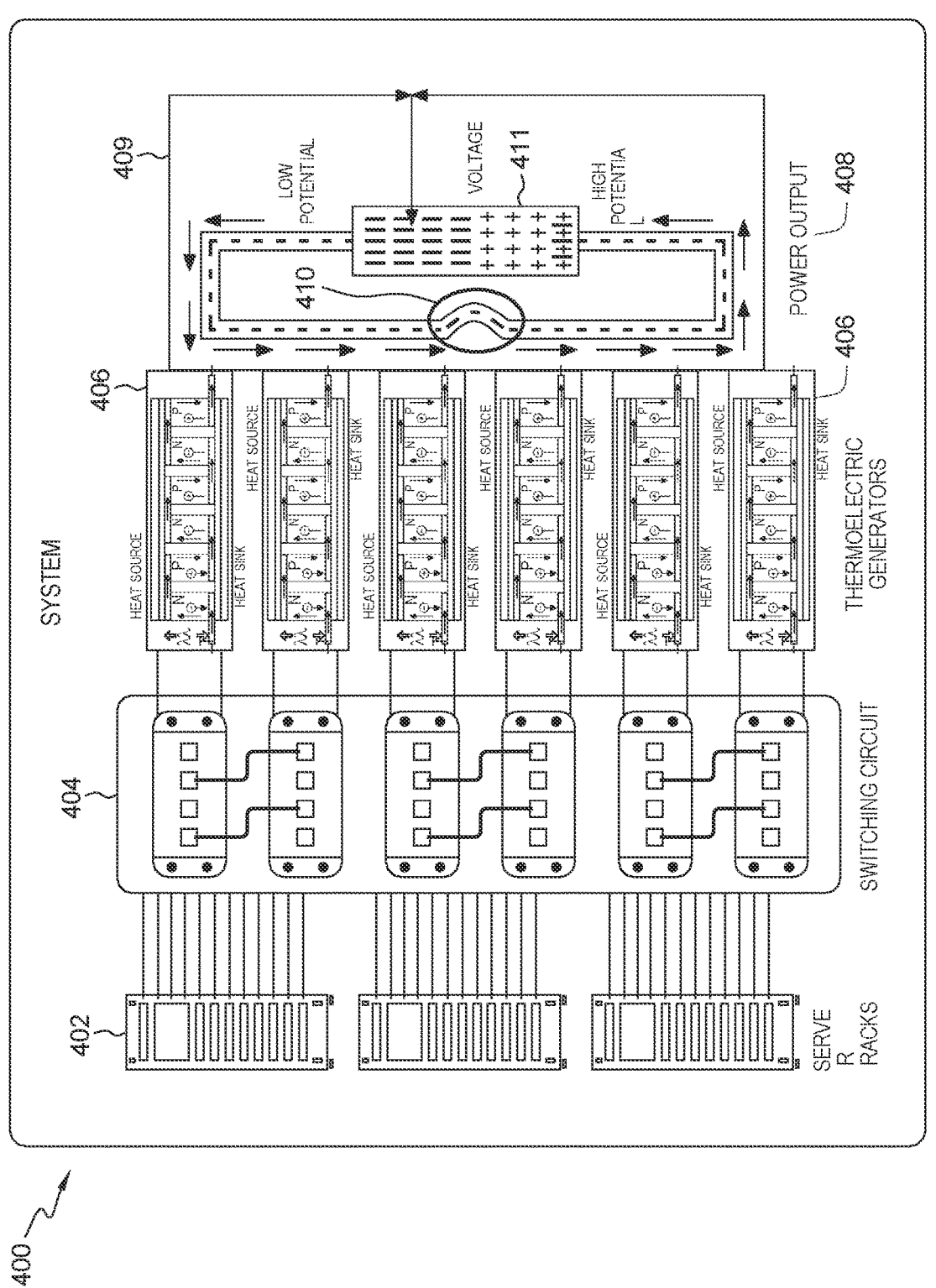
FIG. 4 is a schematic block diagram of a system, according to an embodiment of the present disclosure, for management of thermal energy from electrical components of a computer data center to generate an electrical power output using a thermoelectric generator.

Referring to FIG. 4, in one embodiment according to the present disclosure, a system 400 is depicted for management of thermal energy from a computer data center to generate an electrical power output using a thermoelectric generator. The system includes multiple server racks 402 each including a plurality of electrical components. There can be a plurality of racks of different sizes in the datacenter. The components can include thermal switches or thermal switching circuit 404. The switching circuit 404 is connected to a series of thermoelectric generators 406, and connected to the plurality of electrical components, or heat areas in the racks wherein the heat is generated by the components. The switching circuit can use thermal imaging to assess thermal output from components, and dynamically allow thermal conductivity from the racks to thermoelectric generators. Output terminals from the thermoelectric generators 406 are connected via a conduit 409 to a voltage block 411 of a power output circuit 408. The power output circuit 408 includes a load 410. The system implements dynamic switching of thermal areas or heat areas at the racks by leveraging the use of the switching circuit to dynamically thermally connect the heat output from the components in the racks to a heat source of the thermoelectric generators. Similarly, dynamic switching applies to thermal areas which lack heat or are cooled, and the cooling effect can be thermally connected from the racks via the switching circuit to heat sinks of the thermoelectric generators. In certain datacenter settings where exhaust heat vacate the building, such thermal load can be designed in such a way that goes through a thermal corridor or corridors' conduits to harness that energy and increase the overall power efficiency footprint of the datacenter.

Referring to FIG. 5, an optimization framework 450 is depicted. A maximizing equation 452 is presented for maximizing a non-uniform heat generation, with respect to or subject to a number of constraint equations 454. An input includes an N number of distributed servers, and an M number of workload tasks. An output includes $W_{scheduling}$ for task scheduling on server, and $Q_n$ for heat generated from the servers. Maximizing equation 452 includes a max heat C equal to the sum of maximum distance between two heat generating components Q. The function of equation 452 is to maximize the distance between the heat generated by each pair of servers or heat generating components in the 'N' set of distributed servers.

The constraint equations include a constraint equation 1 for work allocation W, and a constraint equation 2 for heat generated Q. The heat generation profile of the server for a given set of workloads is represented by $f_{schedule}$. Constraint equation 3 is discussed below. Constraint equation 4 is directed to CPU (Central Processing Unit). Constraint equation 5 is directed to RAM (Random Access Memory). Constraint equation 6 is directed to HDD (Hard Disk Drives).

More specifically, referring to FIG. 5, the optimization framework is for maximizing difference between the heat generated by the pair of servers by scheduling the workloads with the given constraints on memory, disk space and CPU (Central Processing Unit) requirements.

The Notations are defined as follows:

HDD—Hard disk drive space requirements;

RAM—Random Access Memory requirements;

CPU—number of CPU requirements;

nc—computation resource of servers;

N—number of distributed servers;

M—number of workload tasks;

Task_j—task 'j' specifies the computational resources that need to be allocated, estimated execution time and deadline according to service level agreements.

W_scheduling—tasks scheduling on servers (matrix stores the starting time for tasks execution and their allocation on specific servers);

$Q^k$ generated—Heat generated from server 'k';

f schedule—Heat generation profile of the server for the given set workloads;

$W^k$ allocation—subset of tasks scheduled to be executed to each server k, from the N set of distributed servers;

$t^{kj}$ start—start time of task 'j' in server 'k';

$t_j$ execution—execution time of task 'j'; and $t^j$ deadline—specified deadline of task 'j' as per service level agreements.

Referring to FIG. 5, and referring to constraint equation 1, the subset of tasks Wk allocation scheduled to be executed to each server k, from the 'N' distributed servers is determined using a task scheduling matrix as represented by constraint equation 1.

Referring to constraint equation 2, the proportion of heat generated is derived based on the 'nc' computational resources of the server, with each having been assigned a weight ω according to the proportion of workload computational resource, as represented by constraint equation 2.

Referring to constraint equation 3, the execution time of a scheduled task is not allowed to exceed the specified execution deadline, as represented by constraint 3.

Referring to constraint equations 4, 5, and 6. The relation between the total computational resources requested by the tasks scheduled for execution on a server and the server's available resources is represented. The computational resources allocated to the tasks scheduled on a server 'k' should be less than the total resources of that server.

Other Embodiments and Examples

Figure 6:
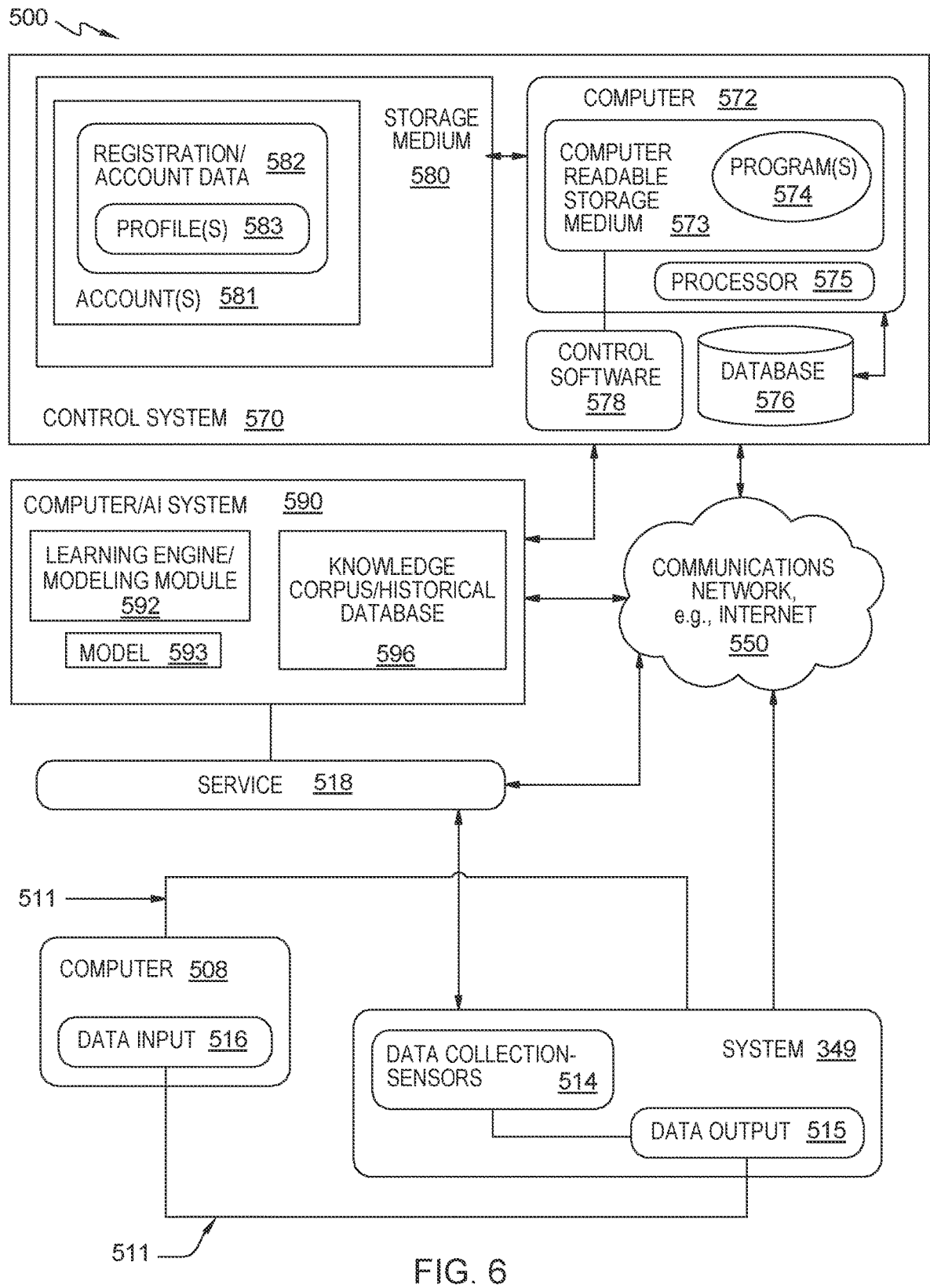
FIG. 6 is a schematic block diagram, according to another embodiment of the present disclosure, depicting a system for management of thermal energy from electrical components of a computer data center to generate an electrical output using a thermoelectric generator.
Figure 7:
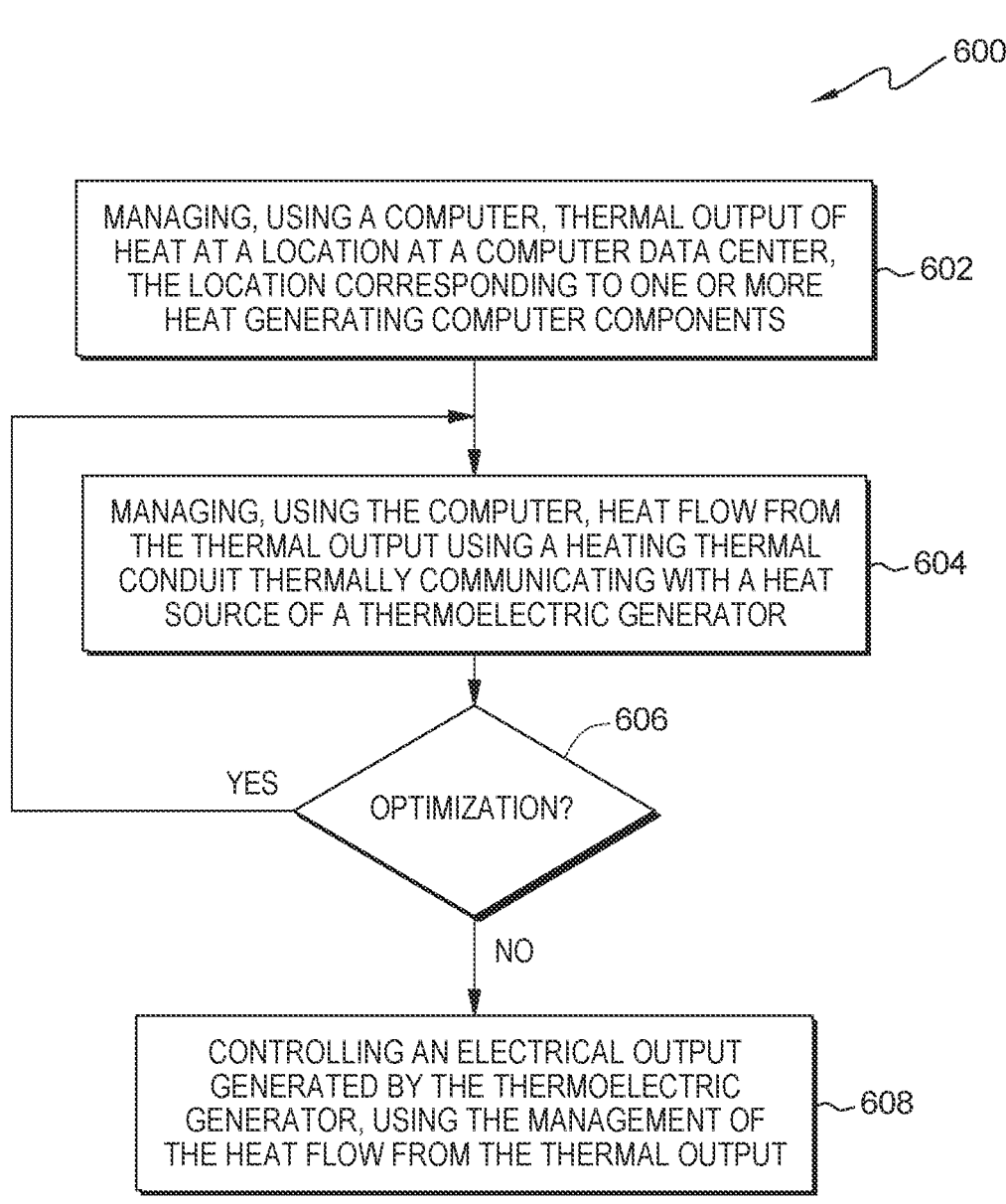
FIG. 7 is a flow chart illustrating another method according to an embodiment of the present invention, with respect to the system depicted in FIG. 6.

Referring to FIGS. 6 and 7, according to an embodiment of the present disclosure, a computer implemented method 600 in FIG. 7 for management of thermal energy from a computer data center to generate an electrical power output using a thermoelectric generator is depicted. Further, in one embodiment, a system 500 shown in FIG. 6, can be used to implement the method 600. The system 500 includes the system 349 shown in FIG. 3C communicating with a computer 508. The computer 508 can manage thermal controllers 511 that communicate with the heat conduit 310 and the cooling conduit 311 which thermally communicate with the heat source 351 and the cool side 352 of the thermoelectric generator 350, respectively. For example, the thermal controllers can include a physical junction of conductive material which can be selectively connected to one or more thermal conduits. The computer 508 communicates with a control system 570 via the network 550.

Again, referring to FIGS. 6 and 7, the method 600 includes managing, using a computer 508, thermal output of heat at a location 306 (FIG. 3C) at a computer data center 300, the location corresponding to one or more heat generating computer components 304, as in operative block 602. The method includes managing, using the computer, heat flow from the thermal output using a heating thermal conduit thermally communicating with a heat source of a thermoelectric generator (e.g., a heat input for the thermoelectric generator), as in operative block 604. In one embodiment, the method can optimize a differential in heat output or generation with respect to a cooling or cooled area in the racks. An approach of maximizing or customizing the heat differential in areas in the rack which can then be used to thermally supply the heat source and cooling area or cool side of a thermoelectric generator, can maximize or customize electrical voltage output by the thermoelectric generator. When optimization is desired at operative block 606, the method can return to block 604. When optimization is not desired at operative block 606, the method proceeds. The method includes controlling an electrical output (e.g., a voltage and/or electrical current) generated by the thermoelectric generator, using the management of the heat flow from the thermal output, as in operative block 608.

Thereby, a method and system can include optimizing the workload scheduling across servers to maximize non-uniform heating across servers, and thus generating the maximal energy from thermoelectric generators, as described in the embodiments herein.

In one example, the method can further include receiving, at the computer 508, ambient temperature data, such as surface ambient temperature data, for the location corresponding to the heat generating computer component in the computer data center. For example, data 514 can include data collected by sensors 514 and provided as a data output 515 from the system to a data input 516 of the computer 508. In another example, a service 518 can receive sensor data from the system and communicate with remote services such as a database 596 and a control system 570 via a network 550.

The method can further include monitoring the ambient temperature data for the location, or one or more locations in the rack. The thermoelectric generator can use a temperature difference between the heat input and a cooling element in the thermoelectric generator. The temperature difference can be enabled by the heat flow, which can be managed by the computer, to the heat source via the heating thermal conduit providing a heat input to the heat source.

The method can further include managing power consumption of the heat generating computer component, or multiple components, to vary the thermal output from the heat generating computer component to control the heat flow to the heat source of the thermoelectric generator.

The method can further include managing, using the computer, a thermal connection to the heating conduit to control the heat flow to the heat source. For example, opening and closing a thermal circuit to allow or discourage thermal exchange between two points or locations, respectively.

The method can further include receiving at the computer, ambient temperature data for each of a plurality of locations corresponding to heat generating computer components in the computer data center. The method can also further include selectively allowing heating thermal conduits corresponding to each of a plurality of locations which correspond to heat generating computer components in the computer data center, to provide heat flow (e.g., heating thermal flow), respectively from each of the heating thermal conduits, to the heat source of the thermoelectric generator.

The method of can further include monitoring ambient temperature data for each of a plurality of locations corresponding to heat generating computer components in the computer data center. And further, managing power consumption of the heat generating computer components to vary heat outputs corresponding to each of the heat generating computer components to control the heat flow from each of the heat generating computer components, using the heating thermal conduits, respectively, to the heat source of the thermoelectric generator.

The method can include selectively allowing heating thermal conduits corresponding to each of a plurality of locations corresponding to heat generating computer components in the computer data center, to provide heat flow (e.g., heating thermal flow), respectively. The heat flow is from each of the heating thermal conduits, to corresponding heat sources of thermoelectric generators.

The method can further include monitoring ambient temperature data for each of a plurality of locations corresponding to the heat generating computer components in the computer data center. And the method can include managing power consumption of the heat producing components to vary heat outputs corresponding to each of the heat generating computer components to control the heat flow from each of the heat generating computer components, using the heating thermal conduits, respectively. The controlled heat flow is to the corresponding heat sources of the thermoelectric generators, respectively.

The method of further includes managing, using the computer, a second thermal output at a cooling location at the computer data center. The second thermal output is for cooling and thermally communicating with a heat sink (e.g., a cooling input for a cooling component on a thermoelectric generator). The method includes managing, using the computer, the second thermal output for cooling using a cooling conduit thermally communicating with the heat sink of the thermoelectric generator. The method includes controlling the electrical output generated by the thermoelectric generator, by the management of the second thermal output for cooling.

The method can further include receiving, at the computer, ambient temperature data for the cooling location corresponding to the heat sink in the computer data center. The method includes selectively allowing the cooling conduit from the cooling location to provide cooling thermal conductivity (e.g., thermal cooling) to the heat sink of the thermoelectric generator.

The method can further include monitoring, at the computer, the ambient temperature data for the cooling location. The method includes managing a second thermal connection to the cooling conduit to control the cooling thermal conductivity (cooling flow) to the heat sink.

The method can further include monitoring ambient temperature data for each of a plurality of locations corresponding to the heat generating computer components in the computer data center. The method further includes selectively allowing heating thermal conduits corresponding to each of the plurality of locations corresponding to the heat generating computer components in the computer data center, to provide heat flow, respectively. The heat flow is from each of the heating thermal conduits, to corresponding heat sources of an array of thermoelectric generators. The method includes managing power consumption of the heat producing components to vary heat outputs corresponding to each of the heat generating computer components to control the heat flow from each of the heat generating computer components, using the heating thermal conduits, respectively, to the corresponding heat sources of the array of thermoelectric generators, respectively. The method includes managing, using the computer, a second thermal output at a cooling location at the computer data center, the second thermal output for cooling using a cooling conduit thermally communicating with heat sinks of the array of thermoelectric generators, respectively. The method includes controlling electrical outputs generated by each of the thermoelectric generators of the array of thermoelectric generators, by using the management of the heat flow from each of the heat generating computer components, and by using the management of the second thermal output for cooling thermally communicating with the heat sinks of the array of thermoelectric generators, respectively.

In one example, the heating thermal conduit includes one of a plurality of elements thermally communicating with the heat source of the thermoelectric generator selected from a group consisting of; air, a conductive material thermally contacting the heat sink of the thermoelectric generator, and a fluid. The heat generating computer component can be selected from a group consisting of; a switch, a server, and a router.

The method can further include generating, using the computer, a digital model of the heat flow from the thermal output. The controlling of the electrical output can use the management of the heat flow based on the digital model.

Additional Embodiments and Examples

The method can include an analysis generating a model 593 based on received data. A model can also be generated by an AI system, at least in part. In one example, an AI system can generate a model using an AI system analysis using machine learning. In one embodiment, the method can include generating, using a computer, a computer simulation as a digital model. The method can include generating a digital model, using the computer. The digital model can include digital modeling the operations of the method shown in FIG. 7.

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. In one example according to the present disclosure, a method can generate a model, using a computer, which can include a series of operations.

In another example, the computer 508 can be part of a device. The computer 508 can communicate via a communications network 550, e.g., The Internet, with a computer 572 which is part of a control system 570. The control system can work in conjunction with the computer 508 in executing operation according to methods of the present disclosure and/or be a resource for processing and data storage in accordance with methods of the present disclosure. The computer 572 can include a processor 575 and a computer readable storage medium 573 where an application 574 can be stored which can in one example, embody all or part of the operations of the methods of the present disclosure. The application can include all or part of instructions to implement the method of the present disclosure, embodied in code and stored on a computer readable storage medium. The computer 508 can operate, in all or in part, in conjunction with a remote server by way of a communications network 550, for example, the Internet. The computer 508 can receive data as data input 516, as well as have access to a historical database or knowledge corpus 596. The computer 572 can include a computer readable storage medium 573 which can store one or more programs 574, and a processor 575 for executing program instructions, and can also include control software 578 for managing the one or more programs. The control system can also include a storage medium which can include registration and/or account data 582 and user profiles 583 of users or entities (such entities can include robotic entities) as part of user accounts 581. User accounts 581 can be stored on a storage medium 580 which is part of the control system 570. The user accounts 581 can include registrations and account data 582 and user profiles 583. The control system can also include the computer 572 having a computer readable storage medium 573 which can store programs or code embedded on the storage medium. The program code can be executed by a processor 575. The computer 572 can communicate with a database 576. The control system 570 can also include a database 576 for storing all or part of such data as described above, and other data. The control system can also communicate with a computer system 590 which can include a learning engine/module 592 and a knowledge corpus or database 596.

ADDITIONAL EXAMPLES AND EMBODIMENTS

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items. In one example a user can register and have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading, or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary, and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

More Examples and Embodiments

Additionally, methods and systems according to embodiments of the present disclosure can be discussed in relation to a functional system(s) depicted by functional block diagrams. The methods and systems can include components and operations for embodiments according to the present disclosure and is used herein for reference when describing the operational steps of the methods and systems of the present disclosure. Additionally, the functional system, according to an embodiment of the present disclosure, depicts functional operations indicative of the embodiments discussed herein. The methods and systems of the present disclosure can include a series of operational blocks for implementing one or more embodiments according to the present disclosure. A method shown in the figures may be another example embodiment, which can include aspects/operations shown in another figure and discussed previously but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

The descriptions of the various embodiments of the present invention have been. presented for purposes of illustration but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 8, a computing environment 1000 contains an example of an environment for the execution of at least some of the computer code involved in performing the inventive methods, such as management of thermal energy from a computer data center to generate an electrical power/energy output using a thermoelectric generator 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A non-transitory computer-implemented method for management of thermal energy from a computer data center to generate an electrical power output using a thermoelectric generator, comprising:

managing, using a computer, thermal output of heat at a location at a computer data center, the location corresponding to a heat generating computer component;

managing, using the computer, heat flow from the thermal output using a heating thermal conduit thermally communicating with a heat source of a thermoelectric generator;

controlling an electrical output generated by the thermoelectric generator, using the management of the heat flow from the thermal output;

managing, using the computer, heat flow from thermal outputs of each of a plurality of heating thermal conduits to corresponding heat sources of an array of thermoelectric generators;

managing, using the computer, a cooling conduit thermally communicating with heat sinks of the array of thermoelectric generators; and controlling the electrical outputs of the array of thermoelectric generators using the management of the heat flow and the management of the cooling conduit.

2. The method of claim 1, further comprising:

receiving, at the computer, ambient temperature data for the location corresponding to the heat generating computer component in the computer data center.

3. The method of claim 1, further comprising:

monitoring the ambient temperature data for the location.

4. The method of claim 1, wherein the thermoelectric generator uses a temperature difference between the heat input and a cooling element in the thermoelectric generator, the temperature difference being enabled by the heat flow, managed by the computer, to the heat source via the heating thermal conduit providing a heat input to the heat source.

5. The method of claim 1, further comprising:

managing power consumption of the heat generating computer component to vary the thermal output from the heat generating computer component to control the heat flow to the heat source of the thermoelectric generator.

6. The method of claim 1, further comprising:

managing, using the computer, a thermal connection to the heating conduit to control the heat flow to the heat source.

7. The method of claim 1, further comprising:

receiving at the computer, ambient temperature data for each of a plurality of locations corresponding to heat generating computer components in the computer data center.

8. The method of claim 1, further comprising:

selectively allowing heating thermal conduits corresponding to each of a plurality of locations corresponding to heat generating computer components in the computer data center, to provide heat flow, respectively from each of the heating thermal conduits, to the heat source of the thermoelectric generator.

9. The method of claim 8, further comprising:

monitoring ambient temperature data for each of a plurality of locations corresponding to heat generating computer components in the computer data center; and managing power consumption of the heat generating computer components to vary heat outputs corresponding to each of the heat generating computer components to control the heat flow from each of the heat generating computer components, using the heating thermal conduits, respectively, to the heat source of the thermoelectric generator.

10. The method of claim 1, further comprising:

selectively allowing heating thermal conduits corresponding to each of a plurality of locations corresponding to heat generating computer components in the computer data center, to provide heat flow, respectively from each of the heating thermal conduits, to corresponding heat sources of thermoelectric generators.

11. The method of claim 10, further comprising:

monitoring ambient temperature data for each of a plurality of locations corresponding to the heat generating computer components in the computer data center; and managing power consumption of the heat producing components to vary heat outputs corresponding to each of the heat generating computer components to control the heat flow from each of the heat generating computer components, using the heating thermal conduits, respectively, to the corresponding heat sources of the thermoelectric generators, respectively.

12. The method of claim 1, further comprising:

managing, using the computer, a second thermal output at a cooling location at the computer data center, the second thermal output for cooling and thermally communicating with a heat sink;

managing, using the computer, the second thermal output for cooling using a cooling conduit thermally communicating with the heat sink of the thermoelectric generator; and controlling the electrical output generated by the thermoelectric generator, by the management of the second thermal output for cooling.

13. The method of claim 12, further comprising:

receiving, at the computer, ambient temperature data for the cooling location corresponding to the heat sink in the computer data center; and selectively allowing the cooling conduit from the cooling location to provide cooling thermal conductivity to the heat sink of the thermoelectric generator.

14. The method of claim 13, further comprising:

monitoring, at the computer, the ambient temperature data for the cooling location; and managing a second thermal connection to the cooling conduit to control the cooling thermal conductivity to the heat sink.

15. The method of claim 1, further comprising:

monitoring ambient temperature data for each of a plurality of locations corresponding to the heat generating computer components in the computer data center;

selectively allowing heating thermal conduits corresponding to each of the plurality of locations corresponding to the heat generating computer components in the computer data center, to provide heat flow, respectively from each of the heating thermal conduits, to corresponding heat sources of an array of thermoelectric generators;

managing power consumption of the heat producing components to vary heat outputs corresponding to each of the heat generating computer components to control the heat flow from each of the heat generating computer components, using the heating thermal conduits, respectively, to the corresponding heat sources of the array of thermoelectric generators, respectively;

managing, using the computer, a second thermal output at a cooling location at the computer data center, the second thermal output for cooling using a cooling conduit thermally communicating with heat sinks of the array of thermoelectric generators, respectively; and controlling electrical outputs generated by each of the thermoelectric generators of the array of thermoelectric generators, by using the management of the heat flow from each of the heat generating computer components, and by using the management of the second thermal output for cooling thermally communicating with the heat sinks of the array of thermoelectric generators, respectively.

16. The method of claim 1, wherein the heating thermal conduit includes one of a plurality of elements thermally communicating with the heat source of the thermoelectric generator selected from a group consisting of; air, a conductive material thermally contacting the heat sink of the thermoelectric generator, and a fluid.

17. The method of claim 1, wherein the heat generating computer component is selected from a group consisting of; a switch, a server, and a router.

18. The method of claim 1, further comprising:

generating, using the computer, a digital model of the heat flow from the thermal output; and the controlling of the electrical output using the management of the heat flow being based on the digital model.

19. A system for management of thermal energy from a computer data center to generate an electrical power output using a thermoelectric generator, which comprises:

a computer system comprising; a computer processor, a computer-readable storage medium, and program instructions stored on the computer-readable storage medium being executable by the processor, to cause the computer system to perform the following functions to;

manage, using a computer, thermal output of heat at a location at a computer data center, the location corresponding to a heat generating computer component;

manage, using the computer, heat flow from the thermal output using a heating thermal conduit thermally communicating with a heat source of a thermoelectric generator;

control an electrical output generated by the thermoelectric generator, using the management of the heat flow from the thermal output;

manage, using the computer, heat flow from thermal outputs of each of a plurality of heating thermal conduits to corresponding heat sources of an array of thermoelectric generators;

manage, using the computer, a cooling conduit thermally communicating with heat sinks of the array of thermoelectric generators; and control the electrical outputs of the array of thermoelectric generators using the management of the heat flow and the management of the cooling conduit.

20. An apparatus for management of thermal energy from a computer data center to generate an electrical power output using a thermoelectric generator, which comprises:

a computer for managing a thermal output of heat at a location at a computer data center, the location corresponding to a heat generating computer component;

a heating thermal conduit thermally communicating with the heat generating computer component and with a heat source of a thermoelectric generator, the heating thermal conduit being manageable using the computer to manage heat flow from the thermal output;

an output terminal communicating with the thermoelectric generator and having an electrical output being generatable by the thermoelectric generator, and the electrical output being controllable, by the computer, using the management of the heat flow from the thermal output;

wherein, using the computer, heat flow is managed from thermal outputs of each of a plurality of heating thermal conduits to corresponding heat sources of an array of thermoelectric generators;

wherein, using the computer, a cooling conduit thermally communicating with heat sinks of the array of thermoelectric generators is managed; and wherein, the electrical outputs of the array of thermoelectric generators are controlled using the management of the heat flow and the management of the cooling conduit.

* * * * *